(12) United States Patent
Galbreath et al.

(10) Patent No.: US 10,328,829 B2
(45) Date of Patent: Jun. 25, 2019

(54) THORACIC REGION COMFORT VEHICLE SEATING SYSTEM WITH PNEUMATIC ADJUSTMENT

(71) Applicants: Lear Corporation, Southfield, MI (US); Winsen C. Zouzal, Detroit, MI (US)

(72) Inventors: Ashford Allen Galbreath, Troy, MI (US); Terry O'Bannon, Royal Oak, MI (US); Jennifer Badgley, Waterford, MI (US); Asad S. Ali, Troy, MI (US); Gerald Steven Locke, Lake Orion, MI (US); Thomas S. Hicks, Livonia, MI (US); Mark Weaver, Auburn Hills, MI (US); Winsen C. Zouzal, Detroit, MI (US); Richard L. Harbaugh, South Lyon, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 14/200,870

(22) Filed: Mar. 7, 2014

(65) Prior Publication Data
US 2014/0265491 A1 Sep. 18, 2014

Related U.S. Application Data

(60) Provisional application No. 61/781,066, filed on Mar. 14, 2013.

(51) Int. Cl.
*B60N 2/64* (2006.01)
*B60N 2/90* (2018.01)
*B60N 2/44* (2006.01)

(52) U.S. Cl.
CPC .......... *B60N 2/643* (2013.01); *B60N 2/4415* (2013.01); *B60N 2/914* (2018.02)

(58) Field of Classification Search
CPC ....... B60N 2/643; B60N 2/665; B60N 2/4415
(Continued)

(56) References Cited

U.S. PATENT DOCUMENTS

| 3,982,786 A * | 9/1976 | Burgin | A47C 4/54 297/284.3 |
| 4,097,087 A * | 6/1978 | Garavaglia | A47C 7/46 297/230.14 |

(Continued)

FOREIGN PATENT DOCUMENTS

| CN | 101128138 A | 2/2008 |
| CN | 101439688 A | 5/2009 |

(Continued)

OTHER PUBLICATIONS

Chinese First Office Action dated Nov. 4, 2015, Application No. 201410096458.1, 9 Pages.

(Continued)

*Primary Examiner* — David R Dunn
*Assistant Examiner* — Tania Abraham
(74) *Attorney, Agent, or Firm* — Brooks Kushman P.C.

(57) ABSTRACT

A vehicle seat is provided, in at least one embodiment, comprising a seatback comprising a cushion having a first hardness, and a pneumatic thoracic support structure positioned adjacent the cushion. In at least one embodiment, the pneumatic thoracic support structure comprises a first bladder selectively inflatable to provide a first area having a second hardness higher than the first hardness, with the first area being disposed along a thoracic region of a user's spine when a user is seated in the seat to provide support to at least a portion of the thoracic region of the user's spine.

9 Claims, 4 Drawing Sheets

(58) Field of Classification Search
USPC .............................. 297/284.3, 284.6, 452.33
See application file for complete search history.

(56) References Cited

U.S. PATENT DOCUMENTS

| | | | | |
|---|---|---|---|---|
| 4,491,364 | A | | 1/1985 | Hattori et al. |
| 4,522,447 | A | * | 6/1985 | Snyder .................. A47C 7/022 |
| | | | | 297/452.27 |
| 4,572,578 | A | * | 2/1986 | Perkins .................... A47C 7/42 |
| | | | | 297/452.32 |
| 4,634,179 | A | * | 1/1987 | Hashimoto ............ A47C 7/467 |
| | | | | 297/284.3 |
| 4,753,480 | A | * | 6/1988 | Morell ................... A47C 7/022 |
| | | | | 297/452.27 |
| 4,834,455 | A | * | 5/1989 | Proctor .................. B60N 2/643 |
| | | | | 297/284.7 |
| 4,835,801 | A | * | 6/1989 | Walpin ................... A47C 7/425 |
| | | | | 297/452.32 |
| 5,826,937 | A | | 10/1998 | Massara |
| 5,868,466 | A | | 2/1999 | Massara et al. |
| 5,882,075 | A | | 3/1999 | Partington et al. |
| 6,497,454 | B1 | * | 12/2002 | Davidsson ........... B60N 2/4415 |
| | | | | 297/284.3 |
| 6,530,622 | B1 | | 3/2003 | Ekern et al. |
| 7,059,678 | B1 | * | 6/2006 | Taylor .................... A47C 7/405 |
| | | | | 297/284.4 |
| 7,413,250 | B2 | | 8/2008 | Connolly et al. |
| 7,445,292 | B2 | * | 11/2008 | Moule .................... B60N 2/643 |
| | | | | 297/452.25 |
| 7,703,849 | B2 | * | 4/2010 | Bilak ..................... A47C 7/462 |
| | | | | 297/230.13 |
| 7,727,171 | B2 | * | 6/2010 | Ozaki .................. A61H 9/0078 |
| | | | | 297/284.3 |
| 7,802,853 | B2 | | 9/2010 | Ebe |
| 7,878,590 | B1 | | 2/2011 | Bilak et al. |
| 8,275,514 | B2 | | 9/2012 | Hwang et al. |
| 2003/0038517 | A1 | * | 2/2003 | Moran ................. B60N 2/4415 |
| | | | | 297/284.3 |
| 2005/0082895 | A1 | * | 4/2005 | Kimmig ................. A47C 7/467 |
| | | | | 297/452.41 |
| 2007/0001505 | A1 | * | 1/2007 | Marshall .................. A47C 7/02 |
| | | | | 297/452.41 |
| 2007/0273188 | A1 | * | 11/2007 | Morrison ................. A47C 4/54 |
| | | | | 297/284.3 |
| 2008/0150337 | A1 | | 6/2008 | Bilak et al. |
| 2008/0252120 | A1 | * | 10/2008 | Park ......................... A47C 7/40 |
| | | | | 297/230.13 |
| 2009/0099490 | A1 | | 4/2009 | Durt et al. |

FOREIGN PATENT DOCUMENTS

| | | |
|---|---|---|
| CN | 101734182 A | 6/2010 |
| DE | 3904090 A1 | 8/1990 |
| DE | 199 10 877 A1 | 9/2000 |
| KR | 101221678 B1 | 1/2013 |
| WO | 9742052 A1 | 11/1997 |

OTHER PUBLICATIONS

Chinese Fourth Office Action dated Jul. 31, 2017, Application No. 201410096458.1, Applicant Lear Corporation / Zouzal Winsen C., 12 Pages.

* cited by examiner

THORACIC REGION COMFORT VEHICLE SEATING SYSTEM WITH PNEUMATIC ADJUSTMENT

CROSS-REFERENCE TO RELATED APPLICATIONS

This application claims the benefit of U.S. provisional application Ser. No. 61/781,066 filed Mar. 14, 2013, the disclosure of which is hereby incorporated in its entirety by reference herein.

TECHNICAL FIELD

The present application is directed to a thoracic region comfort support system for a vehicle seatback.

BACKGROUND

In a seated position, the thoracic region of a person's spine is required to support much of the person's upper body mass. When seated in a vehicle seat, particularly for extended periods of time, the muscles of the person's upper body and vertebrae and discs in the thoracic, lumbar and pelvic regions of the spine can become significantly fatigued.

SUMMARY

In at least one embodiment, a vehicle seat is provided comprising a seatback comprising a cushion having a first hardness and a pneumatic thoracic support structure positioned adjacent the cushion. In at least this embodiment, the pneumatic thoracic support structure comprises a first bladder selectively inflatable to provide a first area having a second hardness higher than the first hardness, with the first area being disposed along a thoracic region of a user's spine when a user is seated in the seat to provide support to at least a portion of the thoracic region of the user's spine.

In at least another embodiment, a vehicle seat is provided comprising a seatback comprising a foam cushion having a first hardness, with the foam cushion having a cavity located between the midpoint and upper one-third of the seatback and foam portions adjacent the cavity, and a pneumatic thoracic support structure positioned within the cavity in the seatback. In at least this embodiment, the pneumatic thoracic support structure is selectively inflatable to provide an area having a second hardness 25-200% higher than the first hardness.

In at least yet another embodiment, a pneumatic thoracic support structure positionable within a cavity of vehicle seatback comprising a foam cushion having a first hardness and a cavity located between the midpoint and upper one-third of the seatback is provided. In this embodiment, the pneumatic thoracic support structure comprises a selectively inflatable volume having a second hardness when inflated, with the second hardness being 25-200% higher than the first hardness, and the selectively inflatable volume being disposed along a thoracic region of a user's spine when the support structure is positioned within the cavity and when a user is seated in the seat to provide support to at least a portion of the thoracic region of the user's spine.

DETAILED DESCRIPTION

As required, detailed embodiments of the present disclosure are disclosed herein; however, it is to be understood that the disclosed embodiments are merely examples of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Moreover, except where otherwise expressly indicated, all numerical quantities in this disclosure are to be understood as modified by the word "about" in describing the broader scope of this invention. Practice within the numerical limits stated is generally preferred. Also, unless expressly stated to the contrary, the description of a group or class of materials by suitable or preferred for a given purpose in connection with the invention implies that mixtures of any two or more members of the group or class may be equally suitable or preferred.

It is believed that supporting the thoracic region of the spine can reduce forces and support as much as one-third of the upper body mass. By increasing support of the upper body mass, loads can be reduced on the muscles, vertebrae and discs in the lumbar region and pelvic region of the spine. Decreased load reduces fatigue on these areas of the body. The current prevalent comfort back supporting technology for the vehicle seatbacks focuses on the lumbar (lower) region of the back to provide relief from fatigue.

The present disclosure relates to a support structure as part of a comfort vehicular seating system to provide supporting pressure along the thoracic region of the user's spine between the T2 to T12 vertebrae. In certain embodiments, the support structure is to be positioned along the thoracic region of a seat back when the user is seated. In at least one embodiment, the support structure has an adjustable center portion that, when inflated, provides higher resistance to deflection than the surrounding or adjacent seat foam cushion. Thus, the support structure provides a seating system having a center portion that is harder than the adjacent softer side portions. In at least one embodiment, the size of the center portion is 60-100 mm wide by 150-250 mm tall, with an outer area being 75-100 mm wide by 200-300 mm tall. In this embodiment, the center portion is intended to provide spinal support while the side portions are designed to allow the area along either side of the spine to sink in with less resistance than in the center portion. In at least one embodiment, the support structure is formed of an inflatable air bladder so that the center portion of the seat assembly has a higher hardness and resistance to deflection than the foam forming the side portions adjacent the support structure. In at least one embodiment, the foam is a constant thickness with hardness ranging from 100 to 500N when measured per ASTM D3574 Section B1 with an 8 inch diameter platen deflecting 50% of the thickness or 50 to 300N when measured per ASTM D3574 Section B1 with an 8 inch diameter platen deflecting 25% of the foam thickness. In certain embodiments, the bladders vary in thickness and resistance to deflection depending on how much they are inflated as controlled by the occupant and determined by their personal preference. The support structure can be used in a variety of seating systems. Some exemplary seating systems and components are shown and described below.

A comfort seating system for vehicle seating provides supporting pressure, or in other words a higher pressure relative to adjacent positions, along the thoracic region of the user's spine between the T2 to T12 vertebrae. This system can be either static, non-adjustable, or adjustable to accommodate a wider variety of occupant sizes. It should be understood that, the deflection resistance pressure of the outer foam region and the inner pneumatic bladder region can vary depending on the degree of bladder inflation and amount of penetration by an occupant into the seating system. For example for 10 mm of travel and 1.0 psi bladder inflation the foam pad imparts 0.00432 $N/mm^2$ of support and the center support system imparts 0.00625 $N/mm^2$ of support representing 44.7% higher hardness than the surrounding foam. As another example, for 10 mm of travel and 2.5 psi bladder inflation the foam pad imparts 0.00432 $N/mm^2$ of support and the center support system imparts 0.00858 $N/mm^2$ of support representing a 98.6% higher hardness than the surrounding foam. As another example, for 12.8 mm of travel and 2.5 psi bladder inflation the foam pad imparts 0.00478 $N/mm^2$ of support and the center support system imparts 0.01115 $N/mm^2$ of support representing a 133.3% higher hardness than the surrounding foam. In certain embodiments, the center support portion is 25-200% harder than adjacent areas of the seat cushion foam, in other embodiments 40-150% harder than adjacent areas of the seat cushion foam, in yet other embodiments 50-100% harder than adjacent areas of the seat cushion foam.

There are four main factors that affect subjective comfort: 1) smoothness of the pressure integral; 2) sufficiency of the pressure change; 3) ability to create even pressure for a wide range of anthropometry; and 4) ergonomic/control suitability of actuation.

A thoracic region comfort seating system design is focused on addressing subjective comfort factors. Smoothness of the pressure integral is accomplished by having a centroid of supporting high pressure with a lower pressure zone surrounding either side of the central support to promote a feeling of smooth transition from center to outer edges. In certain embodiments, the center support position is 25-200% harder than adjacent areas of the seat cushion foam, in other embodiments 40-150% harder than adjacent areas of the seat cushion foam, in yet other embodiments 50-100% harder than adjacent areas of the seat cushion foam. In this manner, the occupant will experience relatively little discomfort from feeling the hardness transition between parts of the design. In addition, by supporting the thoracic region, the user's muscular ligamentous structures are supported which may increase biomechanical abilities and efficiencies for the muscular, physiological and neurological systems.

Sufficiency of the pressure change and the need to create even pressure for a wide range of anthropometry can be accommodated by either having the degree of pressure adjustable, or if not adjustable, positioned in the seat back in a location representing a typical location above the seating cushion surface and the T12/L1 vertebrae as measured in anthropometric studies of the fiftieth percentile male and female population, (location of the thoracic region), thereby minimizing the possibility of larger or smaller occupants experiencing discomfort. For instance, the range of T1 to T12 location from typical seat H-Point location by occupant is 204-466 mm for a small female, 241-507 mm for a mid-sized male, and 268-550 mm for a large male, based on crash dummy sizes; and seated height to shoulder of typical occupants is 538 mm for a small female, 604 mm for a mid-sized male, and 676 mm for a large male, (range=138 mm) (based on ANSUR data). In at least certain embodiments, the area of applied pressure moves within these ranges in order for each sized occupant to experience the desired support. In at least certain embodiments, any area great than 550 mm or less than 204 mm from the H-point, (Hip point measurement) of the seat would be considered higher or lower than needed. In at least one embodiment, the unit is centered (i.e., located in a region from the midpoint of the upper ⅓ of the seatback to the midpoint of the seatback) in the seat and sized to accommodate a variety of occupant widths. Ergonomic control and suitability of actuation may be accomplished by having the ability to control pressure and location by adjusting the location and angular position of the unit up, down, forward and/or rearward.

Figure 1:
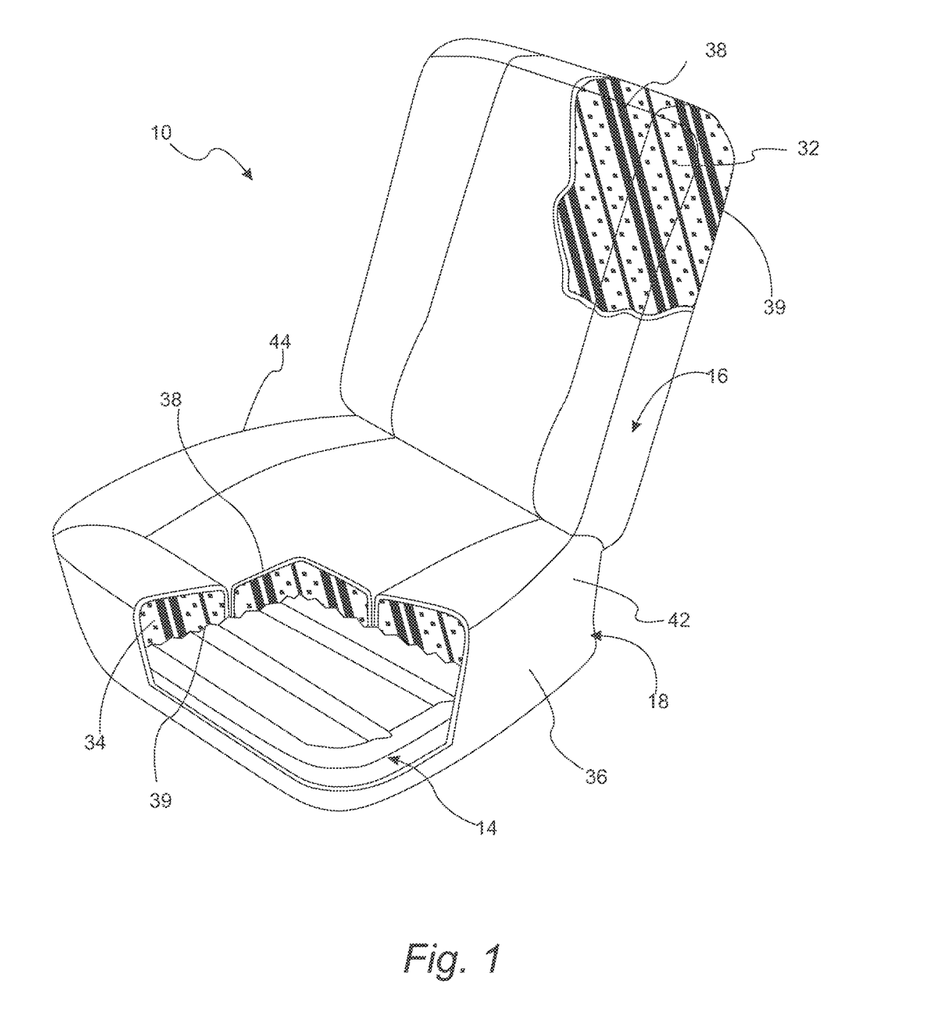
FIG. 1 illustrates a cut-away front view of an exemplary vehicle seat assembly in accordance with one embodiment of the present disclosure.

Referring now to the figures, where like numerals are used to designate like structure throughout to the drawings, a schematic vehicle seat assembly in accordance with at least one embodiment of the present disclosure is generally shown at 10 in FIG. 1. While the vehicle seat assembly 10 is illustrated in FIG. 1 to be a bucket seat assembly, it should be understood that the principles of the present disclosure are applicable to other types of seat assemblies, such as bench, captain, and other types of seat assemblies.

As shown in FIG. 1, the vehicle seat assembly 10 includes a seat frame, generally indicated at 14 having a plurality of mounting brackets (not shown) adapted to operatively secure the seat frame within a vehicle. The seat frame 14 may be constructed from any material suitable for application within a vehicle seat assembly 10, such as aluminum, steel or other metal alloy or a suitable polymer. Further, the seat frame 14 may be manufactured using a technique commonly known in the art, relative to the type of material employed. By way of example, manufacturing techniques may include stamping, welding, fastening or molding a suitable material to form a seat frame 14.

The vehicle seat assembly 10 includes a seat back, generally indicated at 16, and a lower seat assembly, generally indicated at 18. The vehicle seat assembly 10 further includes a back foam cushion 32 and a seat foam cushion generally indicated at 34. The back foam cushion 32 and the seat foam cushion 34 are conventionally secured to the seat frame 14 and/or a seat assembly infrastructure (not shown). The foam cushions 32 and 34 may be secured to the seat frame 14 and/or infrastructure by any method generally known in the art, such as by an adhesive.

The vehicle seat assembly 10 also includes a trim material 36 adapted to engage the foam cushions 32 and 34 in a covering relationship. The trim material 36 may include any material commonly known in the art. By way of example, some of the known materials include cloth, leather, or polymers of sufficient quality and thickness for use in seat trim applications. Polymer trim materials may include a flexible closed cell polymer skin material such as polyvinyl, polyvinyl chloride (PVC), thermoplastic olefin (TPO), or thermoplastic urethane (TPU). Additionally, materials for use as trim material 36 may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass or nylon may be applied to the foam backing or back of the trim material 36 for increasing strength without increasing rigidity.

The seat cushions 32 and 34 each have an upper surface 38 and a lower surface 39 spaced from the upper surface 38. The upper surface 38 of the seat cushions 32 and 34 may be referred to as the "A" surface, and the lower surface 39 may be referred to as the "B" surface.

Figure 2:
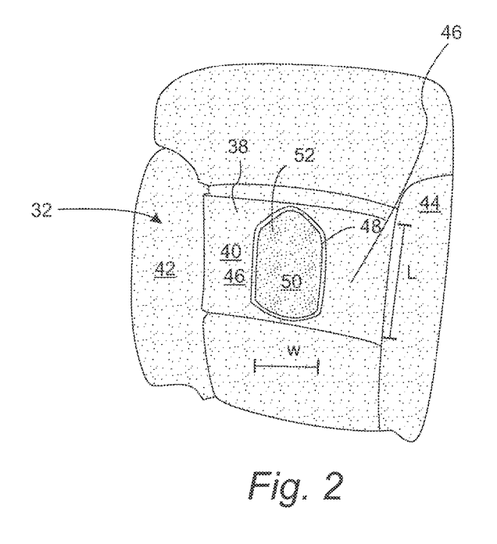
FIG. 2 is a front perspective view of an exemplary seatback cushion assembly useable with the seat assembly of the present disclosure.

FIG. 2 depicts a schematic illustration of the exemplary seatback foam cushion assembly 32 of FIG. 1. The cushion 32 can be any suitable size and shape and in at least one embodiment is 2 to 10 cm thick, and in other embodiments are 3 to 10 cm thick. The exemplary seatback foam cushion 32 includes a central support portion 40 and side bolsters 42 and 44. In at least one embodiment, the central support portion 40 includes a recess 48 that receives a thoracic support assembly 50. In at least one embodiment, the recess 48 is located in a region from the midpoint of the upper ⅓ of the seatback to the midpoint of the seatback 16. In other words, in at least one embodiment, the midpoint of the recess 48 is at the midpoint of the seatback 16, between the upper ⅓ of the seatback to the half-way point of the seatback.

The thoracic support assembly 50 can be secured within the recess 48 in any suitable manner, such as by in molding with the foam, positioned in an opening that extends ⅓ to ½ of the depth of the foam pad, with adhesive, hook/loop fastener, with attachment wire molded into the foam or an interference or friction fit. In another embodiment, a plate or any suitable bracket (not shown) can be secured to the lower surface 39 of the cushion assembly 32 to maintain the thoracic support assembly 50 in position. It should be understood that the recess 48 could originate from the upper surface 38, and thus face towards the occupant, or could originate from the lower surface 39 and thus face away from the occupant. In at least the illustrated embodiment, the central support portion 40 has side portions 46 adjacent the thoracic support assembly 50. It should be understood that the seat cushion 32 can be any suitable size and made of any suitable cushion material and by any suitable cushion making process. It should also be understood that the cushion 32 is similar to conventional cushions except that it has a recess 48 or other suitable receptacle for housing the thoracic support assembly 50. It should also be understood that the recess 48 can be made by any suitable process such as by molding a recess into the cushion or by cutting or machining a recess into the cushion.

In at least the illustrated embodiment, the thoracic support assembly 50 has a width W of 5 to 20 cm and a length of 7 to 40 cm, and in another embodiment, a width W of 7 to 15 cm and a length L of 24 to 30 cm, and is positioned in the cushion assembly 32 to align with the thoracic region of an average user's spine. In at least one embodiment, the side portions 46 of the central support portion 40 of the seat assembly independently have a width of 4 to 15 cm, and in another embodiment of 3 to 13 cm. In at least one embodiment, in its unactuated position the outer surface 52 of the thoracic support assembly 50 can be mounted to be flush with the upper surface 38 or the lower surface 39, or could be embedded a distance, such as 15 to 55 mm, and in other embodiments 20 to 55 mm, from the upper or lower surfaces 38, 39. In at least one embodiment, when inflated or actuated, the outer surface 52 of the thoracic support assembly 50 will protrude a distance, such as 15 to 55 mm, and in other embodiments of 20 to 45 mm, from the upper or lower surface 38, 39, or if embedded within the cushion assembly 32, will displace a sizeable distance, such as 40 to 75 mm causing the upper surface 38 of the cushion assembly 32 to protrude a less sizeable distance, such as 20 to 55 mm. In at least the illustrated embodiment, the thoracic support assembly 50 is the general shape of a square, or rectangle having a low aspect ratio. It is also contemplated however that the thoracic support assembly 50 may have any suitable shape such as, but not limited to, rectangle having a higher aspect ratio, a trapezoid, an inverted trapezoid, a triangle, a circle, or a pear-shape.

The exemplary thoracic support assembly 50 illustrated in FIG. 2 is made of any suitable material and provides an inflatable chamber or air or other fluid bladder that communicates with a pneumatic fluid source, such as air, to selectively fill the chamber with air or other suitable fluid. In doing so, as the chamber fills, the outer surface 52 of the thoracic support assembly 50 is urged forward away from the upper surface 38 of the seat cushion 32 and more specifically the central support portion 40 of the seat cushion assembly 32. As pressure builds in the chamber, the outer surface 52 of the thoracic support assembly 50 is urged forward a suitable distance, such as between 15 and 55 mm, to cause pressure in the thoracic region area of a user's spine. Thus, when inflated or actuated, the outer surface 52 of the thoracic support assembly 50 moves a first distance from its unactuated position to its actuated position. In at least one embodiment, the first distance is 15 to 55 mm, in other embodiments 20 to 45 mm, in yet other embodiments 40 to 75 mm, in yet other embodiments 20 to 55 mm. The pressure inside the inflated, or activated, thoracic support assembly 50 in at least one embodiment is 0.1 to 12 psi (pounds/square inch), in at least another embodiment 0.2 to 8 psi, and in yet other embodiments of 0.5 to 5 psi.

Figure 3:
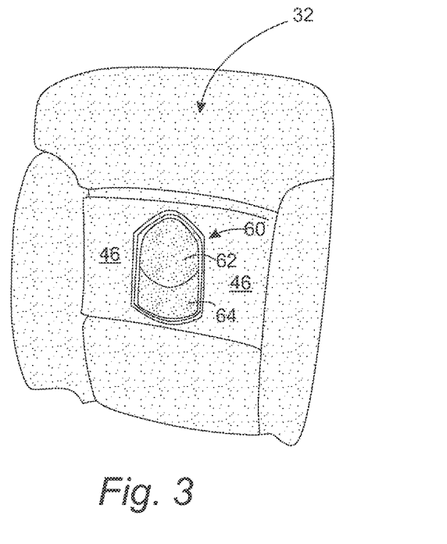
FIG. 3 is a view similar to FIG. 2 showing another exemplary seatback cushion assembly useable with the seat assembly of the present disclosure.

As shown in FIG. 3, another embodiment of a thoracic support assembly 60 is shown. The thoracic support assembly 60 is similar to the thoracic support assembly 50 of FIG. 2 in construction, materials and operation with an exception of multiple bladders 62 and 64 being provided as opposed to the single bladder of the assembly 50 of FIG. 2. Each bladder 62 and 64 can be operated independently to provide a desired pressure to a selected area of a user's spine. The upper bladder 62 can be employed when a user has a thoracic region located in the upper back, such as a 50 percentile male, that is located at an elevated position relative to an average user's spine. The lower air bladder 64 can be inflated when a relatively small user with a thoracic region positioned lower than on the average person's back, such as for a 5 percentile female is seated in the vehicle seat assembly. For larger users who have a relatively large or high thoracic region, both the air bladders 62 and 64 can be pressurized as needed. Each bladder 62 and 64 can be individually inflated with individual pressure regulation. In at least one embodiment, each of the bladders 62 and 64 can independently inflate to a pressure 0.2 to 8 psi, and in at least another embodiment of 0.4 to 4 psi. In at least the illustrated embodiment, the upper bladder 62 of the thoracic support assembly 60 has a width W of 5 to 20 cm and a length of 7 to 20 cm, and in another embodiment, a width W of 3 to 15 cm and a length L of 16 to 25 cm. In at least the illustrated embodiment, the lower bladder 64 of the thoracic support assembly 60 has a width W of 5 to 20 cm and a length of 3 to 10 cm, and in another embodiment, a width W of 7 to 15 cm and a length L of 3 to 7 cm.

Figure 4:
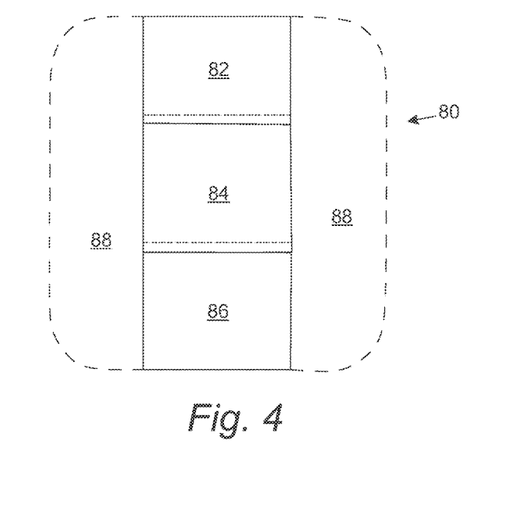
FIG. 4 is a schematic illustration of a bladder design usable with a seatback cushion assembly of the present disclosure.

Referring to FIG. 4, another example of a thoracic support assembly 80 is shown. The thoracic support assembly 80 illustrated in FIG. 4 has multiple centrally aligned overlapping bladders or chambers 82, 84 and 86 extending along the central portion of the thoracic support assembly 80 and can have optional side bladders 88 on opposing sides of the central bladders 82-86. As shown in this embodiment, the bladder in this and other embodiments can be assembled with overlap so that a portion of the upper bladder covers a portion of the adjacent lower bladder. This has been found to provide additional comfort in some embodiments. Each bladder 82-86 can be designed to inflate in sequence with the lower chamber 86 being inflated first and the upper chamber 82 being inflated last. In at least one embodiment, the bladders 82-86 each have a dimension (width×length) of 10×15 cm, and in another embodiment of 7.5×11.5 cm. Each chamber 82-86 can be individually inflated with individual pressure regulation and/or filled in unison, in any order (i.e., from lower bladder to upper bladder, from upper bladder to lower bladder, or any other order). In at least one embodiment, each of the chambers 82-86 can independently inflate to a pressure of 0.1 to 8 psi, in at least another embodiment of 0.2 to 4 psi, and in yet another embodiment of 0.5 to 2.5 psi. Such an arrangement allows for a specific tailoring of the location and an amount of pressure to be placed on a user's spine depending upon the location of the user's thoracic region.

Moreover, each of the side chambers 88, if present, can also be independently inflated and pressure regulated as needed. In at least one embodiment, each of the side chambers 88 can independently inflate to a pressure of 0.1 to 7 psi, and in at least another embodiment of 0.2 to 4 psi. In at least one embodiment, the side chambers 88 each have a dimension (width×length) of 70 mm×300 mm, and in another embodiment of 150×260 mm. The side chambers 88 are optional and/or optionally inflatable, and in at least one embodiment are used only if extra pressure is desired to help push the thoracic support assembly 80, and specifically the central bladders 82-86, towards the outer surface of the cushion assembly. It should be noted that the side chambers 88 could optionally be located behind or to the rear of chambers 82-86, as opposed to, or in addition to, being located on the side of chambers 82-86. The center chambers 82-86, when inflated, create a higher pressure zone than the optional adjacent side chambers 88, if inflated, or adjacent seat foam. In at least one embodiment, pressure differential in the center chambers 82-86 is 20 to 50% more psi relative to the adjacent areas.

While FIG. 4 illustrates a thoracic support assembly 80 having three centrally aligned bladders, it should be understood that any suitable number of central bladders could be employed. For instance, thoracic support assemblies having four or more chambers could be employed. As can be readily understood, any number of chambers and size, shape and spacing of chambers could be employed as desired.

Figure 5:
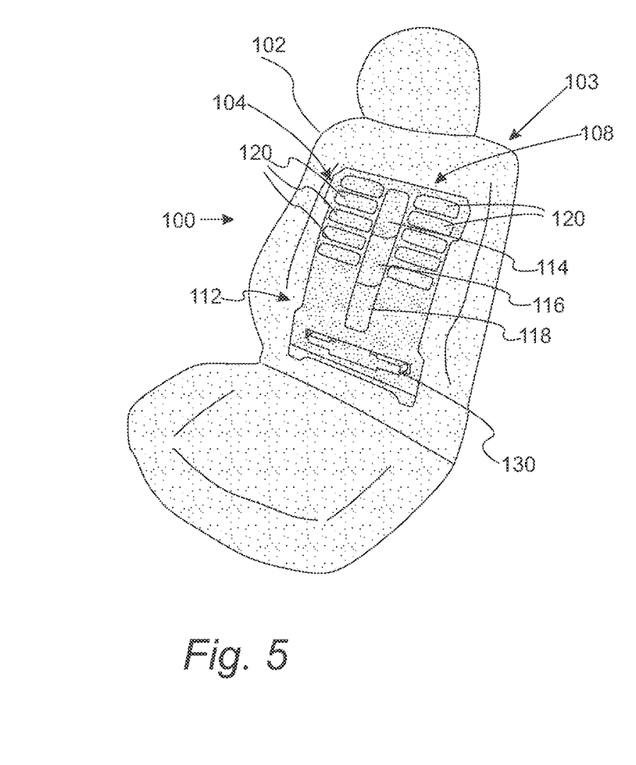
FIG. 5 is a front perspective view of a vehicle seat assembly with a portion of the trim cover removed for better illustration in accordance with another embodiment of the present disclosure.

As shown in FIG. 5, another embodiment of a seat assembly 100 is shown. The seat assembly 100 has a trim cover 102 having a central portion removed for illustrative purposes. In at least one embodiment, the seat assembly 100 has seatback 103 having a center portion 104 having a thoracic support assembly 108 therein. In at least the illustrated embodiment, the thoracic support assembly 108 comprises a bladder assembly 112 received within the seatback 103. In at least one embodiment, the bladder assembly 112 is received within a cutout portion, or a molded cavity, in the foam cushion of the seatback 103 in a similar manner and location as the thoracic support assembly 50 described above. For instance, the bladder assembly 112 can be molded with the foam, positioned in an opening that extends ⅓ to ½ of the depth of the foam pad, and attached in any suitable manner, such as by in molding with the foam, positioned in an opening that extends ⅓ to ½ of the depth of the foam pad, with adhesive, hook/loop fastener, with attachment wire molded into the foam, or an interference or friction fit. In at least the illustrated embodiment, the bladder assembly 112 has a plurality of central bladders 114, 116 and 118 and a plurality of laterally spaced side bladders 120. As can be readily appreciated, each of the bladders 114-120 can be selectively inflated and have a separate pressure monitor so that desired portions of the seat assembly 100 can be pressurized as needed.

In at least the illustrated embodiment, the upper and lower central bladders 114 and 118 are the same size and the middle central bladder 116 is bigger than the upper and lower central bladders 114 and 118. However, it should be understood that the bladders 114, 116 and 118 can be the same size or could be different sizes as desired. In at least the illustrated embodiments, the upper and lower central bladders 114 and 118 are smaller than the middle central bladder 116. Each of the central bladders 114-118 can be designed to inflate in sequence with the lower central bladder 118 being inflated first and the upper central bladder 114 being inflated last. In at least one embodiment, the central bladder 114-118 each have an independent dimension (width×length) of 3×8 cm. Each bladder 114-118 can be individually inflated with individual pressure regulation and/or filled in unison, in any order, i.e., from lower central bladder to upper central bladder, from upper central bladder to lower central bladder, or any other order. In at least one embodiment, each of the bladders 114-118 can independently inflate to a pressure of 0.2 to 8 psi and in at least another embodiment of 0.4 to 4 psi. Such an arrangement allows for a specific tailoring of the location and amount of pressure to be placed on a user's spine depending upon the location of the user's thoracic region.

Figure 6:
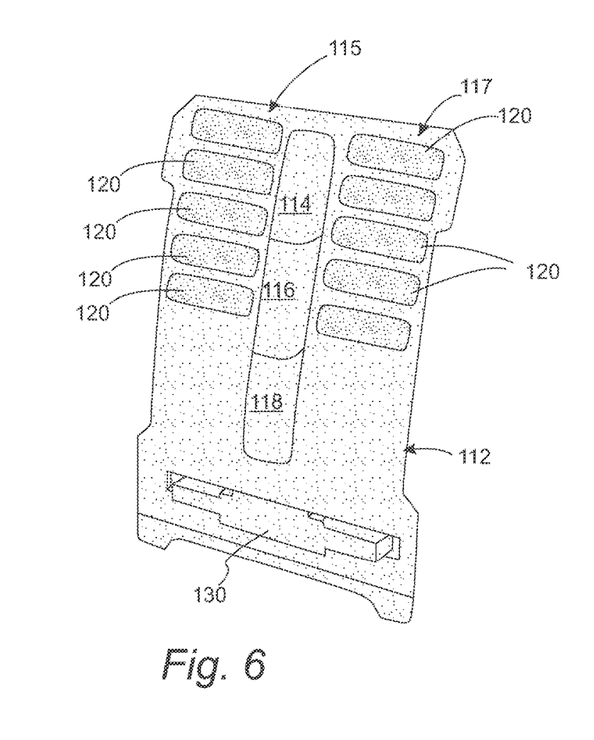
FIG. 6 is a perspective view of an exemplary component usable with the seat assembly of FIG. 5.

In at least the illustrated embodiment shown in FIG. 6, the bladder assembly 112 includes ten (10) laterally spaced side bladders 120, with five (5) of the laterally spaced front side bladders 120 being on the right upper side of the bladder assembly 112 and forming a right bladder zone 115 and the other five (5) of the laterally spaced side bladders 120 being on the left upper side of the bladder assembly 112 and forming a left bladder zone 117, with the central bladders 114-118 separating the right and left bladder zones 115 and 117. In at least one embodiment, each of the side bladders 120 can also be independently inflated and pressure regulated as needed. In at least one embodiment, each of the laterally spaced side bladders 120 can independently inflate to a pressure of 0.1 to 7 psi, and in at least another embodiment of 0.2 to 3 psi. In at least one embodiment, each of the side bladders 120 have a dimension (width×length) of 75 mm×150 mm, and in another embodiment of 100 mm×125 mm. Furthermore, while the side bladders 120 are shown to be uniform in size and shape, it should be understood that the size and shape can individually vary as well as the location can vary as needed.

In at least one embodiment, the central bladders 114-118 inflate to a higher pressure than the side bladder 120, such as 20-35% higher, to provide additional support to the spinal column in the thoracic region. In at least one embodiment, the central bladders 114-118 take up an area of 40 to 85 $cm^2$, and in another embodiment of 50 to 75 $cm^2$ and exert a bladder pressure over this area of 0.2 to 8 psi, and in another embodiment of 0.4 to 4 psi. In at least one embodiment, the each of the right and left bladder zones 115 and 117 take up an area of 400 to 565 $cm^2$, and in another embodiment of 420 to 565 $cm^2$ and exert a bladder pressure over these areas of 0.1 to 7 psi, and in another embodiment of 0.2 to 3 psi.

As can best be seen in FIG. 6, in at least the illustrated embodiments, a logic and inflator module control 130 is provided for controlling the pressurization of the bladders 114-120.

Figure 7:
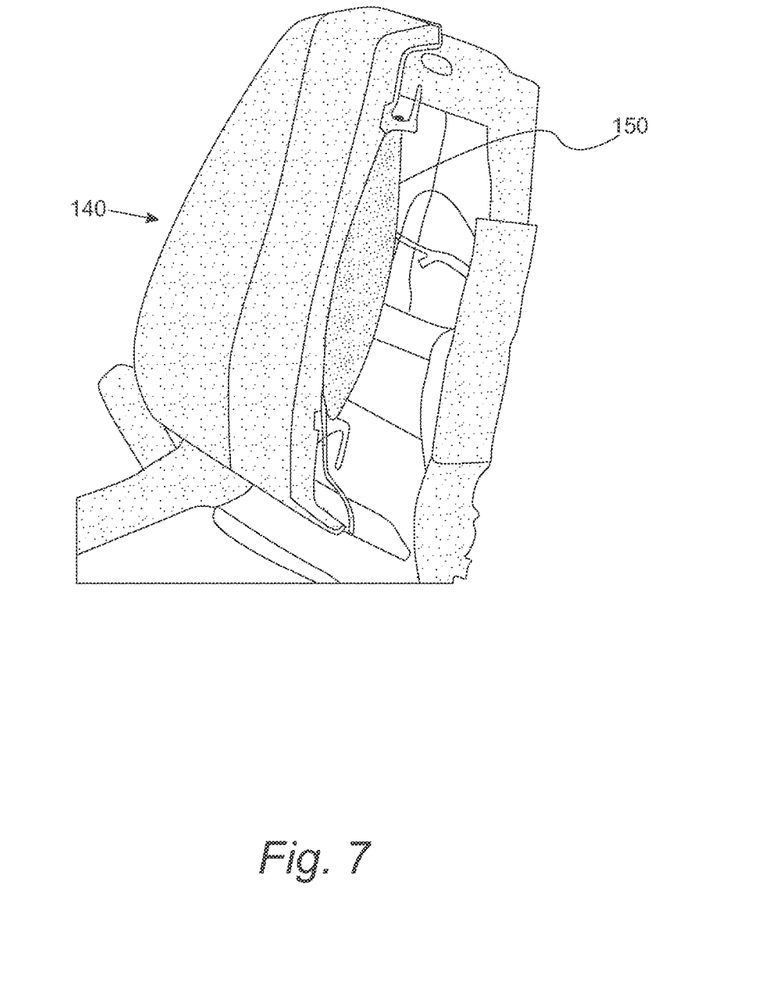
FIG. 7 is a front perspective view of a portion of a seat assembly in accordance with another embodiment of the present disclosure.

Referring to FIG. 7, another embodiment of a seat assembly 140 is shown. The seat assembly 140 of FIG. 7 has a thoracic support assembly comprising a pneumatic adjustment assembly 150 having a tubular bladder that has varying wall thickness such that certain portions will inflate while other portions will remain relatively unchanged in response to an increase of fluid or pressure buildup in the tube 150. While not illustrated, it should be understood that more than one tubular bladder could be used, with the tubular bladder optionally being spaced apart. These tubular bladder(s) can be any suitable size. In at least one embodiment, the expandable vertical tubular bladders run up the center of the back portion of the seat behind or within the foam padding. The size and shape of the vertical tubular bladders can be any suitable size and shape, and in at least one embodiment are relevant to the total length of the back foam pad. In at least one embodiment, the internal volume of each of the bladders is 80,000 mm3 (cubic millimeters) deflated and 160,000 mm3 (cubic millimeters) inflated, and each has a pressure of 20 to 50% more psi than the surrounding cushion area. While not illustrated, it should be understood that the air bladder assembly 150 could have one relatively large tube that extends across the thoracic region of a user's spine.

The details, designs, variants, aspects and embodiments shown and described herein are applicable to automotive, other vehicular, and non-regulated seating. While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. It should be understood that the present disclosure contemplates a seat system or a thoracic region support seating system comprising any combination of features shown in the figures and/or described in the application.

What is claimed is:

1. A vehicle seat comprising:
   a seatback comprising a cushion having a first hardness, the cushion having a top, a bottom, a central axis extending between the top and the bottom, a recess extending along the central axis, an upper foam portion disposed above the recess along the central axis, and a lower foam portion disposed below the recess along the central axis; and
   a pneumatic thoracic support structure positioned within the recess of the cushion, a lowermost region of the pneumatic thoracic support structure being spaced from a bottom edge of the seatback, the pneumatic thoracic support structure comprising a first bladder selectively inflatable to provide a first area having a second hardness higher than the first hardness, the first area being disposed in the upper half of the seatback and having a length extending along the central axis and a width extending across the central axis, with the length being greater than the width such that the first area extends along the central axis and is aligned with a thoracic region of a user's spine when a user is seated in the seat to provide support to at least a portion of the thoracic region of the user's spine;
   wherein the cushion is 2 to 10 cm thick and the first area is disposed between the center of the seatback and the upper one-third of the seatback; and
   wherein the support structure comprises a second bladder selectively inflatable to provide a second area having a third hardness higher than the first hardness, the second area being disposed adjacent to and below the first area.

2. The vehicle seat of claim 1 further comprising a metallic frame, the cushion being disposed on the frame, wherein the cushion has an upper surface, a lower surface, with the recess extending from the upper surface towards the lower surface, with the support structure being located within the recess.

3. The vehicle seat of claim 1 wherein the first bladder has a width of 5-20 cm, a length of 7-20 cm and inflates to a pressure of 0.2-8 psi, and the second bladder has a width of 5-20 cm, a length of 3-10 cm and inflates to a pressure of 0.2-8 psi.

4. The vehicle seat of claim 2 further comprising a trim material covering the support structure.

5. The vehicle seat of claim 4 wherein the seatback is to be connected to a seat frame adapted for mounting in a vehicle.

6. The vehicle seat of claim 2 wherein the recess has a substantially constant width along a length of the recess.

7. A vehicle seat comprising:
   a seatback having a top, a bottom and a central axis extending between the top and the bottom of the seatback, the seatback having a foam cushion having a first hardness, the foam cushion having a cavity extending lengthwise along the central axis and located between the midpoint and upper one-third of the seatback such that a lowermost region of the cavity is spaced from a bottom edge of the seatback, the foam cushion having foam portions adjacent the cavity; and
   a pneumatic thoracic support structure positioned within the cavity in the seatback, the pneumatic thoracic support structure having a length extending along the central axis and a width extending transverse to the central axis, with the width being smaller than the length, the pneumatic support structure being selectively inflatable to provide an area having a second hardness, the second hardness being 25-200% higher than the first hardness;
   wherein the support structure comprises a first bladder selectively inflatable to provide the area having the second hardness; and
   wherein the support structure comprises a second bladder selectively inflatable to cooperate with the first bladder to provide the area having the second hardness, the second bladder being disposed adjacent to and below the first bladder.

8. A vehicle seat comprising:
   a seatback comprising a cushion having a first hardness, the cushion having a top, a bottom, a central axis extending between the top and the bottom, a recess extending along the central axis, an upper foam portion disposed above the recess along the central axis, and a lower foam portion disposed below the recess along the central axis; and a pneumatic thoracic support structure positioned within the recess of the cushion, a lowermost region of the pneumatic thoracic support structure being spaced from a bottom edge of the seatback, the pneumatic thoracic support structure comprising a first bladder selectively inflatable to provide a first area having a second hardness higher than the first hardness, the first area being disposed in the upper half of the seatback and having a length extending along the central axis and a width extending across the central axis, with the length being greater than the width such that the first area extends along the central axis and is aligned with a thoracic region of a user's spine when a user is seated in the seat to provide support to at least a portion of the thoracic region of the user's spine; wherein the pneumatic thoracic support structure comprises a second bladder positioned adjacent to the cushion and adjacent to the first bladder such that a top edge of the second bladder is disposed below a bottom edge of the first bladder.

9. The vehicle seat of claim 8 wherein a width of the second bladder generally corresponds to a width of the first bladder.

* * * * *